(12) United States Patent
Ishigaki (10) Patent No.: US 10,378,655 B2
(45) Date of Patent: Aug. 13, 2019

(54) VALVE DEVICE

(71) Applicant: DENSO CORPORATION, Kariya, Aichi-pref. (JP)

(72) Inventor: Satoshi Ishigaki, Kariya (JP)

(73) Assignee: DENSO CORPORATION, Kariya (JP)

( * ) Notice: Subject to any disclaimer, the term of this patent is extended or adjusted under 35 U.S.C. 154(b) by 10 days.

(21) Appl. No.: 15/672,407

(22) Filed: Aug. 9, 2017

(65) Prior Publication Data

US 2018/0100586 A1    Apr. 12, 2018

(30) Foreign Application Priority Data

Oct. 6, 2016    (JP) .................................. 2016-198040

(51) Int. Cl.
| | |
|---|---|
| *F16K 1/20* | (2006.01) |
| *F16K 1/22* | (2006.01) |
| *F16K 1/226* | (2006.01) |
| *F16K 1/46* | (2006.01) |
| *F17C 13/04* | (2006.01) |
| *F02M 26/54* | (2016.01) |
| *F02M 26/70* | (2016.01) |
| *F16K 3/24* | (2006.01) |
| *F02B 39/00* | (2006.01) |
| *F02C 7/04* | (2006.01) |

(52) U.S. Cl.
CPC ............. *F16K 1/221* (2013.01); *F02M 26/54* (2016.02); *F02M 26/70* (2016.02); *F16K 1/226* (2013.01); *F16K 1/2261* (2013.01); *F16K 1/46* (2013.01); *F17C 13/04* (2013.01); *F02B 39/00* (2013.01); *F02C 7/04* (2013.01); *F16K 1/205* (2013.01); *F16K 1/2092* (2013.01); *F16K 3/243* (2013.01)

(58) Field of Classification Search
CPC .......... F16K 1/46; F16K 1/2042; F16K 1/205; F16K 1/2085; F16K 1/2092; F16K 3/243; F16K 5/168; F16K 5/188; F16K 5/205
USPC .......................... 277/310, 311, 357, 447, 459
See application file for complete search history.

(56) References Cited

U.S. PATENT DOCUMENTS

| | | | | |
|---|---|---|---|---|
| 3,053,543 A | * | 9/1962 | Kallin | F16K 1/2261 277/641 |
| 4,828,274 A | * | 5/1989 | Stannard | B65D 90/105 220/378 |
| 4,892,287 A | * | 1/1990 | Weevers | F16J 15/32 251/172 |

(Continued)

FOREIGN PATENT DOCUMENTS

| | | |
|---|---|---|
| JP | 2004-084694 A | 3/2004 |
| JP | 2007-239667 A | 9/2007 |

(Continued)

*Primary Examiner* — Reinaldo Sanchez-Medina
*Assistant Examiner* — Hailey K. Do (57) ABSTRACT

The present disclosure provides a valve device including a housing, a shaft, a butterfly valve, and a sealing member. The butterfly valve has a disk shape and defines a groove formed on an outer circumferential surface. The butterfly valve is fixed to the shaft and housed in a passage in the housing to selectively open and close the passage. The sealing member has an annular shape and fit into the groove. The outer circumferential surface of the sealing member has an arc surface having a diameter equal to the diameter of the passage. The arc surface comes into contact with the inner wall of the passage when the passage is closed.

4 Claims, 10 Drawing Sheets

(56) References Cited

U.S. PATENT DOCUMENTS

| | | | |
|---|---|---|---|
| 6,439,255 B1* | 8/2002 | Chamberlain | F16K 1/2261 |
| | | | 137/15.25 |
| 6,962,343 B2* | 11/2005 | Abiko | F16J 9/14 |
| | | | 277/434 |
| 2004/0232623 A1* | 11/2004 | Panelli | F16J 9/061 |
| | | | 277/459 |
| 2005/0183705 A1 | 8/2005 | Nanba | |
| 2007/0095334 A1 | 5/2007 | Nanba | |
| 2009/0020099 A1 | 1/2009 | Bessho et al. | |
| 2011/0023846 A1* | 2/2011 | Miyazaki | F02M 26/05 |
| | | | 123/568.16 |
| 2013/0341548 A1* | 12/2013 | Dehais | F16K 1/222 |
| | | | 251/306 |
| 2018/0038489 A1* | 2/2018 | Hielkema | F16J 15/022 |

FOREIGN PATENT DOCUMENTS

| | | | |
|---|---|---|---|
| JP | 2015-094335 A | 5/2015 | |
| JP | 2015-108313 A | 6/2015 | |

\* cited by examiner

FIG. 10
COMPARATIVE EXAMPLE

FIG. 11
COMPARATIVE EXAMPLE

FIG. 12
COMPARATIVE EXAMPLE

FIG. 13
COMPARATIVE EXAMPLE

FIG. 14
COMPARATIVE EXAMPLE

FIG. 15
COMPARATIVE EXAMPLE

FIG. 16
COMPARATIVE EXAMPLE

FIG. 17
COMPARATIVE EXAMPLE

VALVE DEVICE

CROSS REFERENCE TO RELATED APPLICATION

This application is based on reference Japanese Patent Application No. 2016-198040 filed on Oct. 6, 2016, the disclosure of which is incorporated herein by reference.

TECHNICAL FIELD

The present disclosure relates to a valve device that selectively opens and closes a passage by a circular-shaped butterfly valve, more specifically, relates to a valve device having a butterfly valve and a sealing member that is disposed in a groove formed around an outer circumferential surface of the sealing member.

BACKGROUND

Conventionally, there has been an EGR device that recirculates exhaust gas of an internal combustion engine toward an intake side. The EGR device has a valve device to selectively open and close a passage for an exhaust gas (hereinafter, referred to as an "EGR gas").

Such a valve device may include, for example, a housing, a shaft, a butterfly valve, and a sealing member.

The housing has a passage with a circular cross-section, and the shaft is rotatably supported by the housing.

The butterfly valve has a disk shape and defines a groove formed around an outer circumferential surface. The groove is recessed from the outer circumferential surface radially inward of the butterfly valve. The butterfly valve is fixed to the shaft and is housed in the passage. The sealing member is formed into an annular shape and fit in the groove. The sealing member has an inner circumferential surface that defines a clearance α between the inner circumferential surface and a bottom of the groove along a radial direction of the butterfly valve. The sealing member is configured to seal between the outer circumferential surface of the butterfly valve and an inner wall of the passage, when the passage is closed by the butterfly valve, by being elastically deformed to have at least a portion of the outer circumferential surface of the sealing member come into contact with the inner wall of the passage (see Patent Literature JP2005-233063A).

In such a valve device, a clearance β is intentionally formed in the groove along a thickness direction of the butterfly valve in addition to the clearance α in consideration of the difference between linear expansion coefficients of the housing, the valve body, and the sealing member that arises from their material differences. However, the clearances α and β may allow the sealing member to be angled relative to an ideal position, when the passage is closed, due to dimensional errors of each component or errors arising during assembling process. As a result, spaces are formed around the outer circumferential surface of the sealing member.

Especially, when the valve device is used for the EGR device, the housing, the butterfly valve, and the sealing member may significantly change in their volumes due to a drastic temperature change at the passage between high temperature of the exhaust gas and low temperature of the outside air at a cold area. Therefore, it is necessary to make the clearances α, β larger when the valve device is used for the EGR device. As a result, the above-described angle of the sealing member would increase, and the spaces would become larger.

In view of the above, it is an objective of the present disclosure to provide a valve device having a butterfly valve and a sealing member disposed in a groove around an outer circumferential surface of the sealing member, wherein spaces are prevented from forming even if a sealing member is tilted when a passage is closed.

SUMMARY

An aspect of the present disclosure provides a valve device including a housing, a shaft, a butterfly valve, and a sealing member. The housing defines a passage therein that has a circular cross-section with a diameter. The shaft is rotatably supported by the housing. The butterfly valve has a disk shape and defines a groove formed on an outer circumferential surface. The butterfly valve is fixed to the shaft and housed in the passage to selectively open and close the passage. The sealing member has an annular shape and fit into the groove. The groove includes a bottom and a side surface. The sealing member and the bottom of the groove define a clearance therebetween along a radial direction of the sealing member. The sealing member and the side surface of the groove define a clearance therebetween along a thickness direction of the sealing member. The sealing member is configured to seal between the outer circumferential surface of the butterfly valve and an inner wall of the passage, when the passage is closed by the butterfly valve, by being elastically deformed to have at least a portion of an outer circumferential surface of the sealing member come into contact with the inner wall of the passage.

The outer circumferential surface of the sealing member has an arc surface having a diameter equal to the diameter of the passage. The arc surface comes into contact with the inner wall of the passage when the passage is closed.

Accordingly, even if the sealing member is tilted when the passage is closed, since the outer circumferential surface of the sealing member has a constant diameter, it is possible to avoid forming spaces, which would generate in a conventional sealing member around the outer circumferential surface. Hence, in the valve device having the butterfly valve and the sealing member disposed in the groove around the outer circumferential surface of the sealing member, spaces can be prevented from generating even if the sealing member is tilted when the passage is closed.

BRIEF DESCRIPTION OF THE DRAWINGS

The above and other objects, features and advantages of the present invention will become more apparent from the following detailed description made with reference to the accompanying drawings. In the drawings.

DETAILED DESCRIPTION

Next, a plurality of embodiments will be described below with reference to drawings. It is needless to say that following embodiments are some examples of the present disclosure, and therefore the present disclosure is not limited to these embodiment. Furthermore, each of the substantially same structures among the embodiments will be assigned to the respective common referential numeral and the description of the substantially same structures will be omitted in the subsequent embodiments.

First Embodiment

Referring to FIGS. 1 to 7, a valve device 1 according to the first embodiment will be described below.

Figure 1:
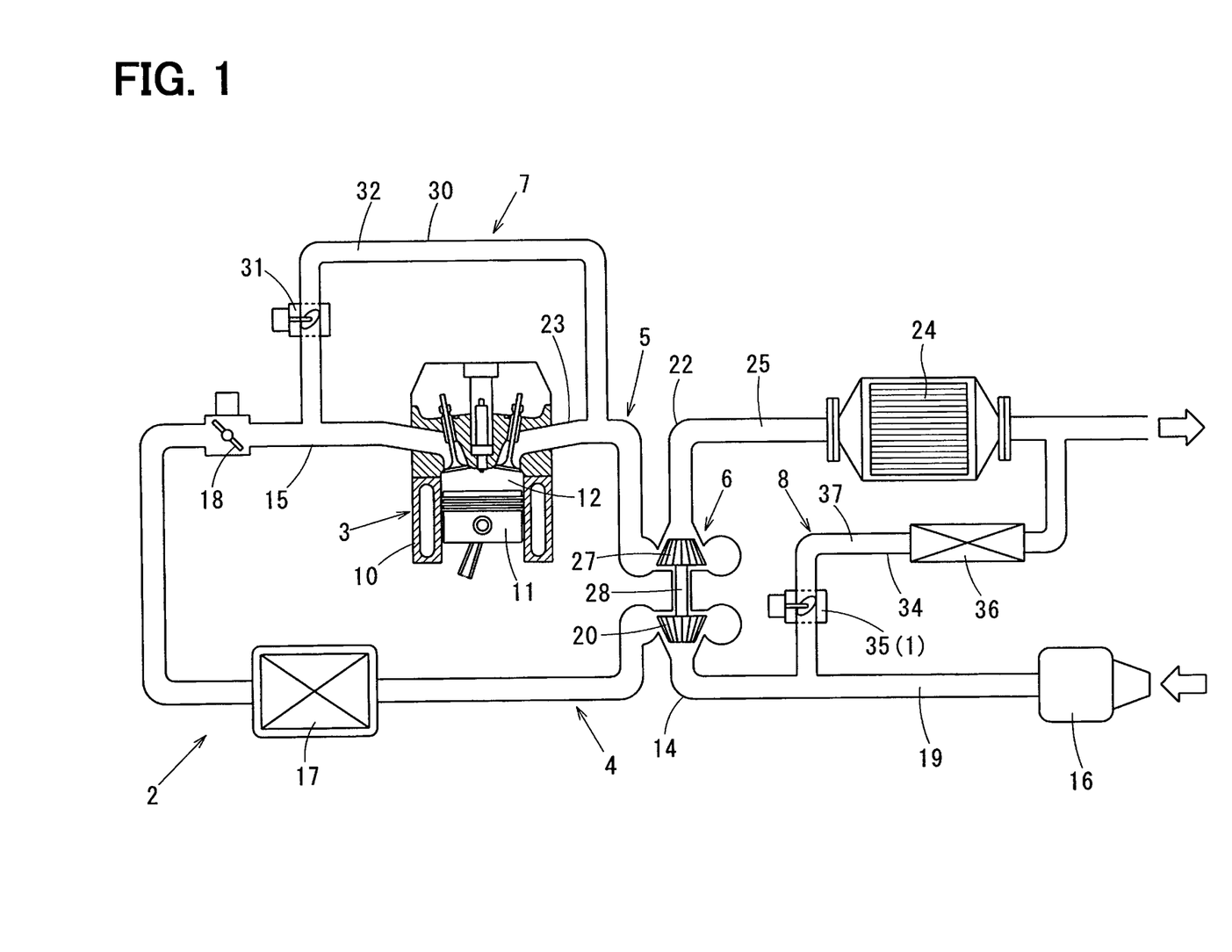
FIG. 1 is an entire configuration of an internal combustion engine having a valve device according to a first embodiment.

Initially, an internal combustion engine 2 having the valve device 1 will be described with reference to FIG. 1. The internal combustion engine 2 includes an engine body 3, an intake device 4, an exhaust device 5, a supercharger 6, a high pressure EGR device 7, and a low pressure EGR device 8.

It should be noted that the engine body 3 includes cylinders 10 each housing a piston 11 and a combustion chamber 12 is defined inside the cylinder 10 by the piston 11.

The intake device 4 draws outside air and supplies the air into the engine body 3. The intake device 4 includes an intake pipe 14, an intake manifold 15, an air cleaner 16, an intercooler 17, and a throttle 18.

The intake pipe 14 is a pipe to introduce an outside air into the combustion chamber 12. The intake pipe 14 defines an intake passage 19 therein. The intake pipe 14 has one end open toward the atmosphere and the other end connected to the intake manifold 15. The intake manifold 15 connects the other end of the intake pipe 14 to the engine body 3. The intake manifold 15 is divided into branch pipes with the same number as the cylinders 10.

The air cleaner 16, the intercooler 17, and the throttle 18 are disposed in the intake passage 19 in this order from the upstream side thereof.

The air cleaner 16 is configured to remove foreign substances from the air taken from the outside. The intercooler 17 cools an air that was compressed and heated by a compressor 20 of the supercharger 6. The throttle 18 adjusts an intake amount for the engine body 3.

The exhaust device 5 is configured to discharge an exhaust gas from the engine body 3 and includes an exhaust pipe 22, an exhaust manifold 23, and an exhaust gas purifying unit 24.

The exhaust pipe 22 is a pipe to guide exhaust gas from the engine body 3 to the atmosphere and defines an exhaust passage 25 therein. The exhaust manifold 23 connects one end of the exhaust pipe 22 to the engine body 3. The exhaust manifold 23 is divided into branch pipes with the same number as the cylinders 10.

The exhaust gas purifying unit 24 decomposes hydro carbon (HC) contained in exhaust gas and traps particulate matters (PM). The exhaust gas purifying unit 24 is disposed in the exhaust pipe 22.

The supercharger 6 supercharges air to the combustion chamber 12 by compressing air in the intake pipe 14 using an energy from the exhaust gas. The supercharger 6 includes the compressor 20, a turbine 27, and a shaft 28. The compressor 20 is disposed in the intake passage 19 between the air cleaner 16 and the intercooler 17 to compress air. The turbine 27 is disposed in the exhaust passage 25 between the exhaust manifold 23 and the exhaust gas purifying unit 24. The turbine 27 is operated by an energy from the exhaust gas. The shaft 28 connects the compressor 20 to the turbine 27. The compressor 20 and the turbine 27 are synchronously rotated by the shaft 28.

The high pressure EGR device 7 is configured to recirculate exhaust gas upstream of the turbine 27 into the intake passage 19, and to supply the exhaust gas into the combustion chamber 12 together with air compressed by the compressor 20. The high pressure EGR device 7 includes a high pressure pipe 30 and the valve apparatus 31. The high pressure EGR pipe 30 connects the exhaust pipe 22 at a position upstream of the turbine 27 to the intake pipe 14 at a position downstream of the throttle 18. The high pressure pipe 30 defines a high pressure EGR passage 32 and recirculates exhaust gas upstream of the turbine 27 to the air compressed by the compressor 20. The valve apparatus 31 adjusts an amount of exhaust gas (EGR gas) circulated to the intake passage 19 through the high pressure EGR passage 32.

The low pressure EGR device 8 recirculates exhaust gas downstream of the turbine 27 to the combustion chamber 12 together with air downstream of the air cleaner 16. The low pressure EGR device 8 includes a low pressure EGR pipe 34, a valve apparatus 35, and an EGR cooler 36.

The low pressure pipe 34 connects the exhaust pipe 22 at a position downstream of the exhaust gas purifying unit 24 to the intake pipe 14 at a position upstream of the compressor 20. The low pressure EGR pipe 34 defines a low pressure EGR passage 37 to recirculate exhaust gas downstream of the turbine 27 to air before being compressed by the compressor 20. The valve apparatus 35 adjusts an amount of EGR gas recirculated to the intake passage 19 through the low pressure EGR passage 37. Further, the EGR cooler 36 is disposed in the low pressure EGR passage 37 upstream of the valve apparatus 35 and cools EGR gas flowing through the low pressure EGR passage 37. The valve device 1 is used in the valve apparatus 35, as will be described below.

The throttle 18, the valve apparatus 31, and the valve apparatus 35 are controlled by an unillustrated electronic control unit (ECU).

Figure 2:
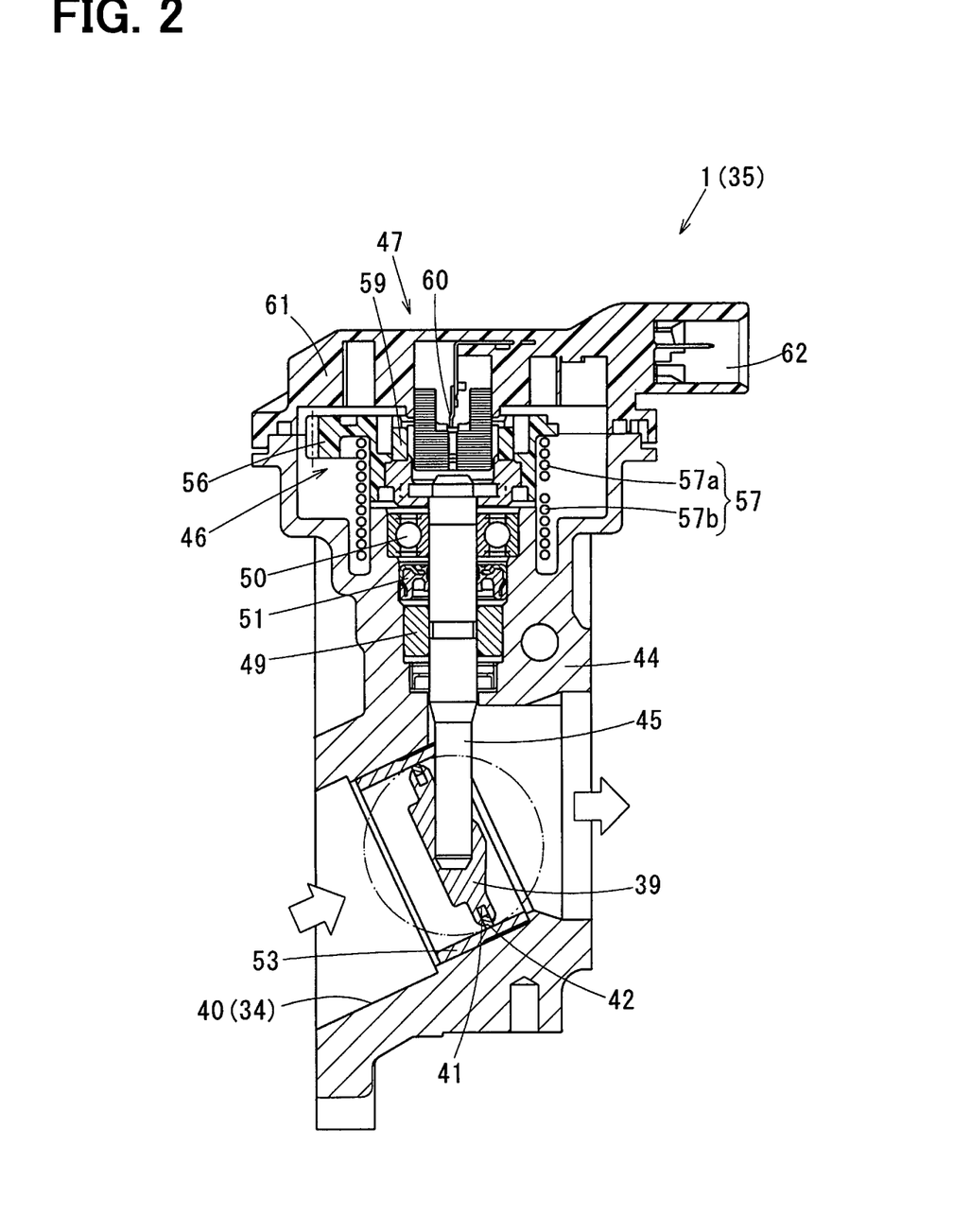
FIG. 2 is a diagram illustrating a structure of the valve device.

FIG. 2 shows the valve device 1.

The valve device 1 is configured to selectively open and close the passage 40 by the butterfly valve 39. The butterfly valve 39 defines a groove 41 formed around an outer circumferential surface. The butterfly valve 39 includes a sealing member 42 in the groove 41. The valve device 1 seals a space between the outer circumferential surface of the butterfly valve 39 and an inner wall of the passage 40 with the sealing member 42. The passage 40 forms a portion of the low pressure EGR passage 37.

The valve device 1 includes, in addition to the butterfly valve 39 and the sealing member 4, a housing 33, a shaft 45, a driving portion 46, and a sensor 47.

Hereinafter, the housing 44, the shaft 45, the butterfly valve 39, the sealing member 42, the driving portion 46, and the sensor 47 will be described in this order. The butterfly valve 39 may be referred to as a "valve body 39".

The housing 44 defines the passage 40 and is made of, e.g., an aluminum alloy die-cast. The passage 40 has a circular cross-section.

The shaft 45 is rotatably supported by the housing 44 through a metal bearing 49 and a ball-bearing 50 and is rotated by the driving portion 46. The shaft 45 has one end, to which a driving force of the driving portion 46 is transmitted, and the other end, which extends into the passage 40. An oil sealing 51 is disposed between the metal bearing 49 and the ball-bearing 50.

The valve body 39 has a disk shape and is fixed to the other end of the shaft 45 inside the passage 40. The valve body 39 is angled relative to an axial direction of the shaft 45 at a specified angle. The valve body 39 adjusts a flow amount of EGR gas flowing through the passage 40 by rotating together with the shaft 45. The valve body 39 and the shaft 45 are formed of a heat-resistance material such as SUS304 stainless steel.

The valve body 39 is housed in a cylindrical body 53 that is fit into and fixed to the passage 40. The valve body 39 is rotated inside the cylindrical body 53. The cylindrical body 53 has an inner diameter slightly greater than the outer diameter of the valve body 39. As with the valve body 39 and the shaft 45, the cylindrical body 53 is formed of a heat-resistance material such as SUS304 stainless steel.

The valve body 39 defines a groove 41 recessed from the outer circumferential surface of the valve body 39. The seat member 42 is disposed in the groove 41.

Figure 3A:
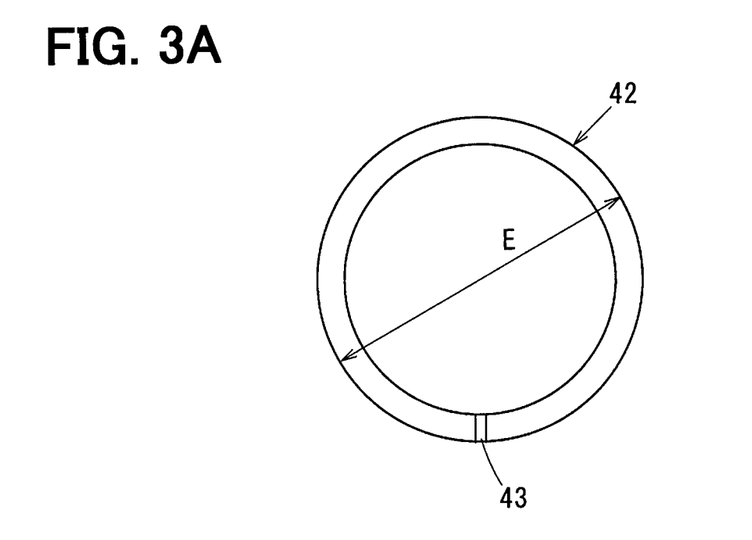
FIG. 3A is a plane view of a sealing member.
Figure 3B:
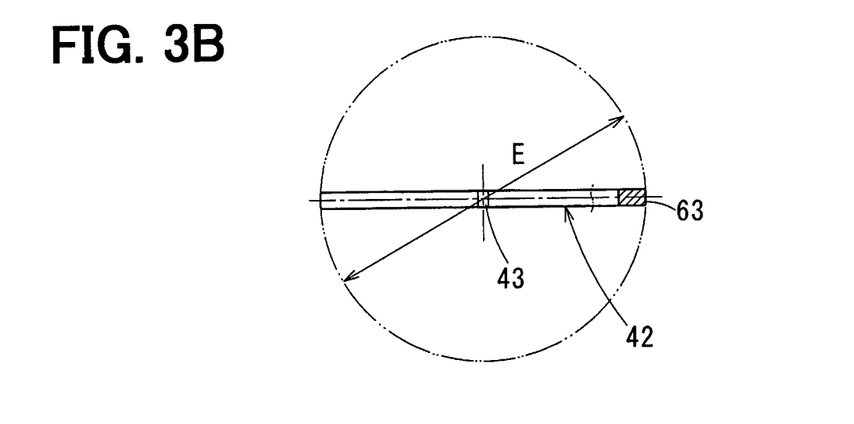
FIG. 3B is a front view of the sealing member.

The sealing member 42 is formed in an annular shape and includes a gap 43 (see FIG. 3A). The sealing member 42 is fit into the groove 41. In the groove 41, a clearance $\alpha$ and a clearance $\beta$ are defined in the radial direction and the thickness direction, respectively, of the valve body 39 (see FIG. 4), taking into account the difference between linear expansion coefficients of the housing 44, the valve body 39, and the sealing member 42 arising from their material differences. That is, the sealing member 42 has the clearance $\alpha$ between an inner circumferential surface of the sealing member 42 and the bottom of the groove 41 and the clearance $\beta$ between one of side surfaces 42a of the sealing member 42 perpendicular to the axis of the sealing member 42 and a side surface of the groove 41. Then, the sealing member 42 seals between the outer circumferential surface of the valve body 39 and an inner wall of the cylindrical body 53, when the passage 40 is closed by the butterfly valve 39, by being elastically deformed to have at least a portion of the outer circumferential surface of the sealing member 42 come into contact with the inner wall of the cylindrical body 53.

It should be noted that the sealing member 42, as with the valve body 39 and the shaft 45, is formed of a heat-resistance material such as SUS304 stainless steel.

The driving portion 46 includes a motor (not shown) and a reduction drive.

The motor is, e.g., a DC motor having a contact mechanism formed of a brash and a commutator. Energization to the motor is controlled by the ECU.

The reduction drive is formed of a gear train that reduces a rotational speed of the motor and transfers the torque to the shaft 45. The gear train may be formed of, e.g., a pinion gear (not shown), an intermediate reduction gear (not shown), a small gear (not shown), and a valve gear 56. The pinion gear is connected to the output shaft of the motor. The intermediate reduction gear engages with the pinion gear. The small gear is supported by a center axis commonly used by the intermediate reduction gear and is rotated together with the intermediate reduction gear. The valve gear 56 is connected to one end of the shaft 45.

A spring 57 is attached between the valve gear 56 and the valve housing 44. The spring 57 is formed by integrally connecting a return spring 57a and a default spring 57b through a U-shaped hook.

The return spring 57a biases the valve body 39 toward a fully closed position, whereas the default spring 57b biases the valve body 39 toward the fully closed position.

The sensor 47 includes a magnet 59, a yoke, and a Hall IC 60. The magnet 59 is rotated together with the shaft 45 at the one end of the shaft 45. The yoke generates annular magnetic circuits across the magnet 59. The Hall IC 60 outputs an electrical signal according to magnetic flux density of a magnetic field generated by the magnet 59.

The Hall IC 60 is housed in a sensor cover 61, and a connector 62 is disposed in the sensor cover 61 to input and output signals between the valve device 1 and the ECU. The sensor cover 61 is fixed to the housing 44 by screws (not shown).

The ECU performs a feedback control to adjust energization to the motor so that a rotational angle of the valve body 39 detected by the sensor 47 (i.e., an opening degree of the passage 40) reaches a target value that is determined according to operating conditions of the engine 2.

According to the valve device 1 of the present embodiment as illustrated in FIGS. 3 to 7, the outer circumferential surface of the sealing member 42 has an arc surface 63 having a diameter equal to the diameter E of the passage 40. The arc surface 63 comes into contact with the wall of the passage 40 when the passage 40 is closed by the butterfly valve 39. It should be understood that "equal to" does not necessary mean that the diameter of the arc surface 63 is exactly the same as the diameter E of the passage 40, and there may be a difference between the diameter of the arc surface 63 and the diameter E of the passage within a range of a tolerance.

Figure 4:
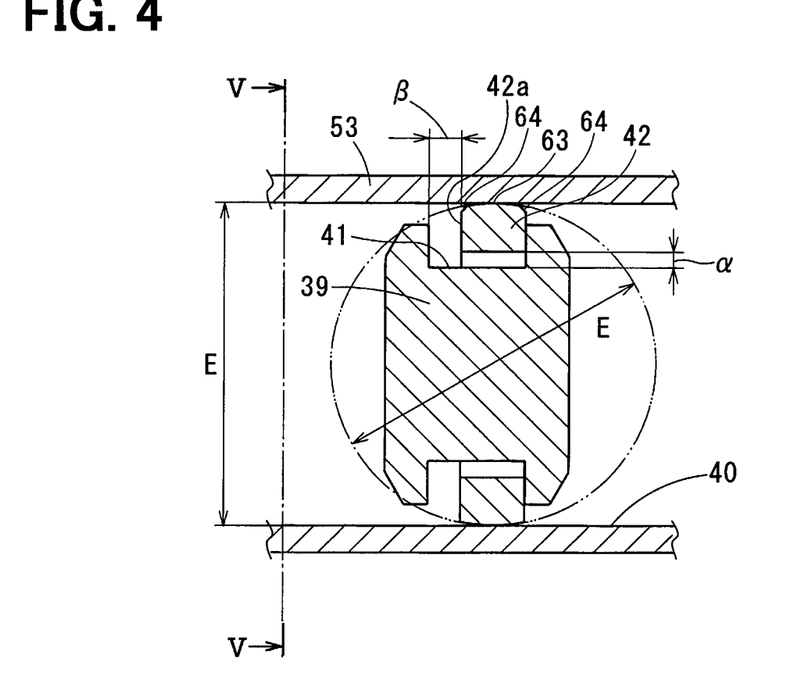
FIG. 4 shows an ideal position of the sealing member where the sealing member is not tilted when the passage is closed.

Furthermore, the clearance α and the clearance β are defined in the groove 41 along the radial direction and the thickness direction, respectively, of the valve body 39, considering the difference between linear expansion coefficients. Thus, the sealing member 42 may be angled relative to an ideal position (described later), when the passage 40 is closed, due to dimensional errors of each component or assembling errors. It should be noted that the angle of the sealing member 42 relative to the ideal position may increase when the clearance β is greater than the clearance α.

Figure 5:
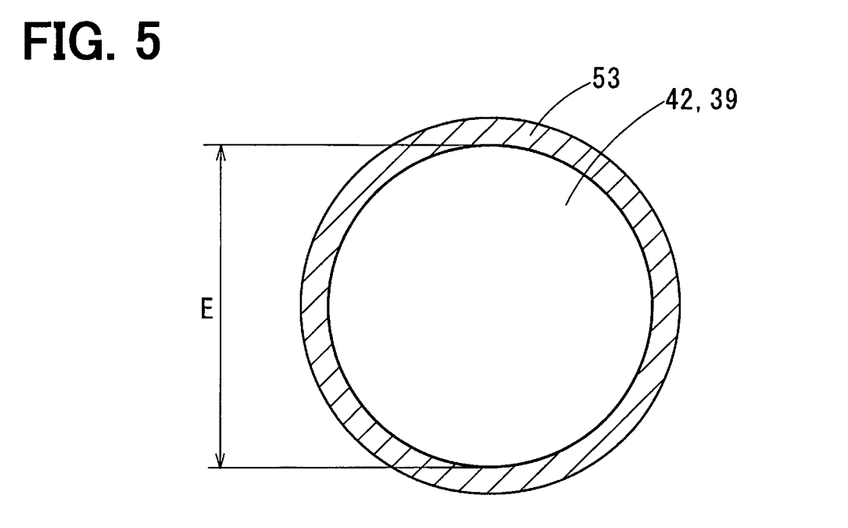
FIG. 5 is a cross-sectional view of the sealing member taken along V-V line where spaces are not generated around an outer circumferential surface of a valve body at the ideal position of the sealing member.

In the ideal position as shown in FIGS. 4 and 5 where the sealing member 42 is not tilted at all when the passage 40 is closed, the diameter of the sealing member 42 is equal to the diameter E of the passage 40 (hereinafter, referred to as a "passage diameter E"). In the present embodiment, the arc surface 63 maintains the same diameter as the passage diameter E even if the sealing member 42 is angled relative to the ideal position (see FIGS. 6 and 7). Thus, spaces A and B (described later with reference to FIGS. 13 and 17) are not formed in the valve device 1 according to the present embodiment. Accordingly, in the valve device 1 having the sealing member 42 that is disposed in the groove 41 formed in the outer circumferential surface of the valve body 39, it is possible to prevent generation of a space even if the sealing member 42 is tilted when the passage 40 is closed.

Next, operation and advantages of the valve device 1 of the present embodiment will be described by comparing the present embodiment with comparative situations where comparative sealing members 142A, 142B are used.

Figure 6:
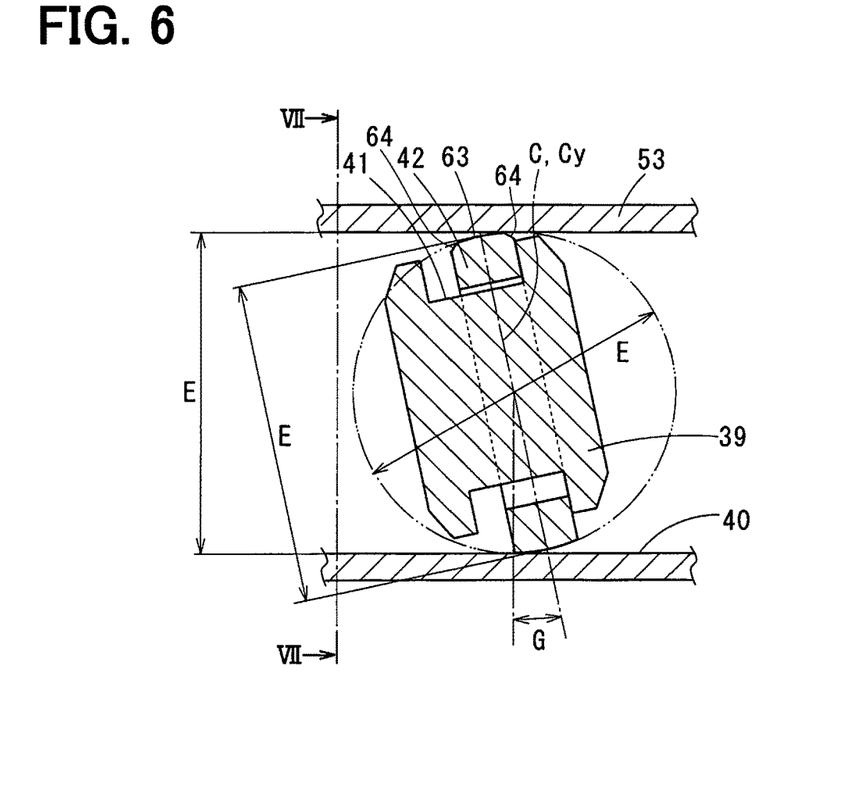
FIG. 6 is an explanatory view of the sealing member at a tilted position when the passage is closed.
Figure 7:
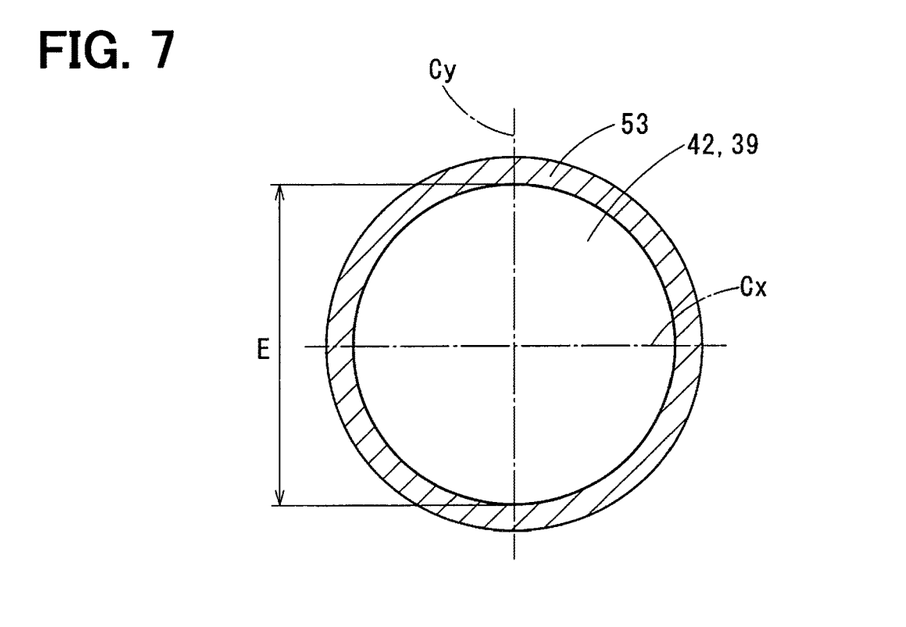
FIG. 7 is a cross-sectional view of the sealing member taken along V-V line where spaces are not generated around the outer circumferential surface of the valve body at the tilted position of the sealing member.
Figure 10:
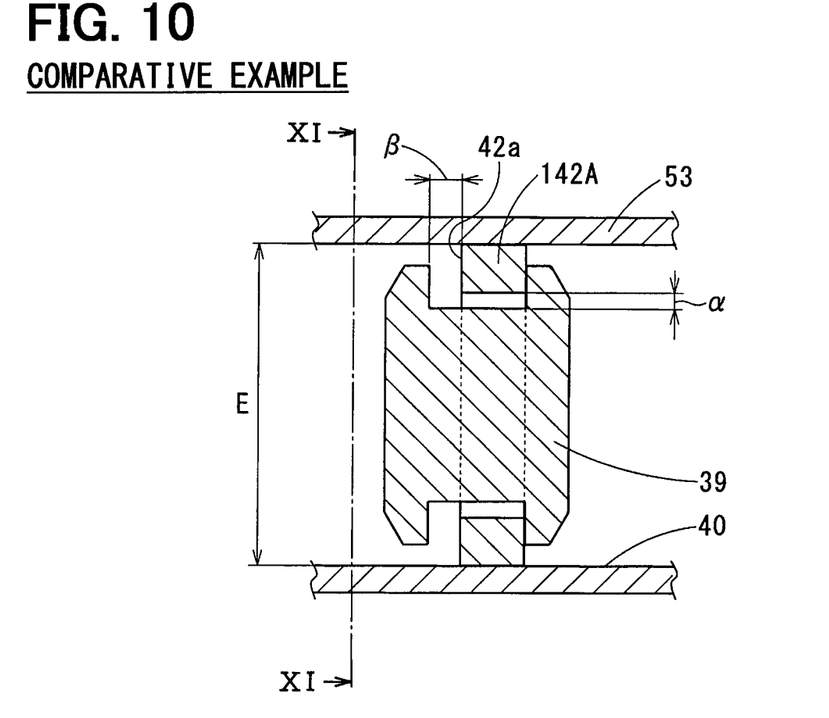
FIG. 10 is a cross-sectional view of a sealing member that is not tilted when a passage is closed according to a comparative example.
Figure 11:
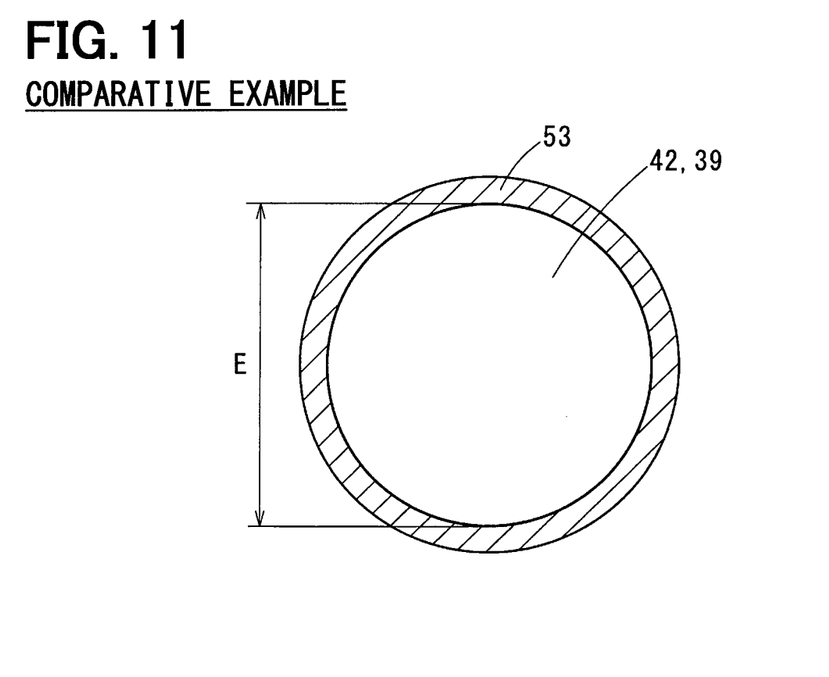
FIG. 11 is a cross-sectional view of the sealing member taken along XI-XI line that is not tilted at the ideal position when the passage is closed where spaces are not generated around an outer circumferential surface of a valve body according the comparative example.
Figure 14:
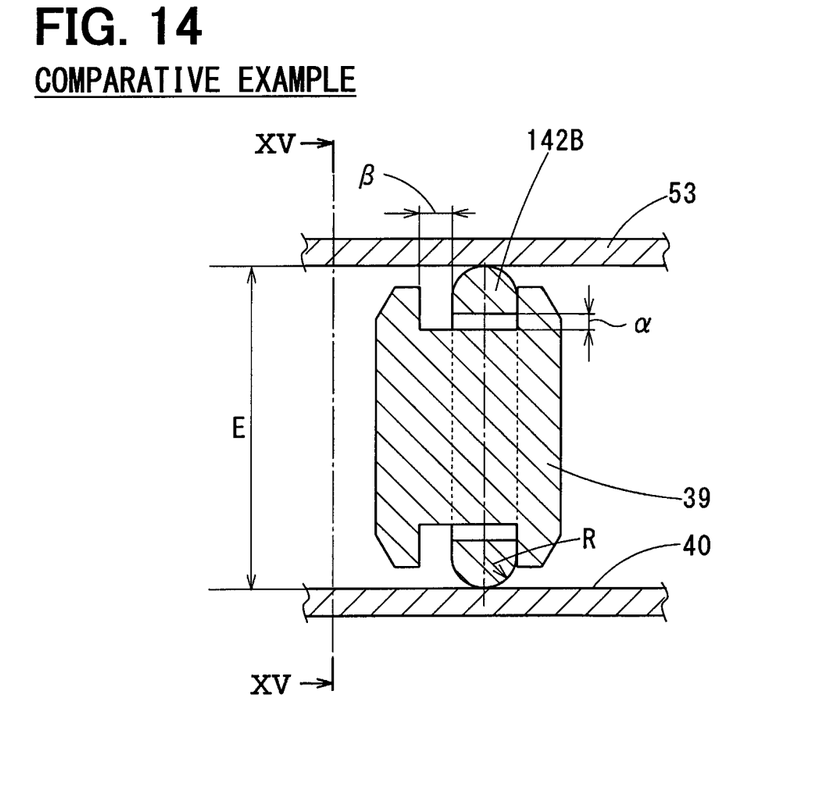
FIG. 14 is an explanatory view of the sealing member at the ideal position where the sealing member is not tilted when the passage is closed according another comparative example.
Figure 15:
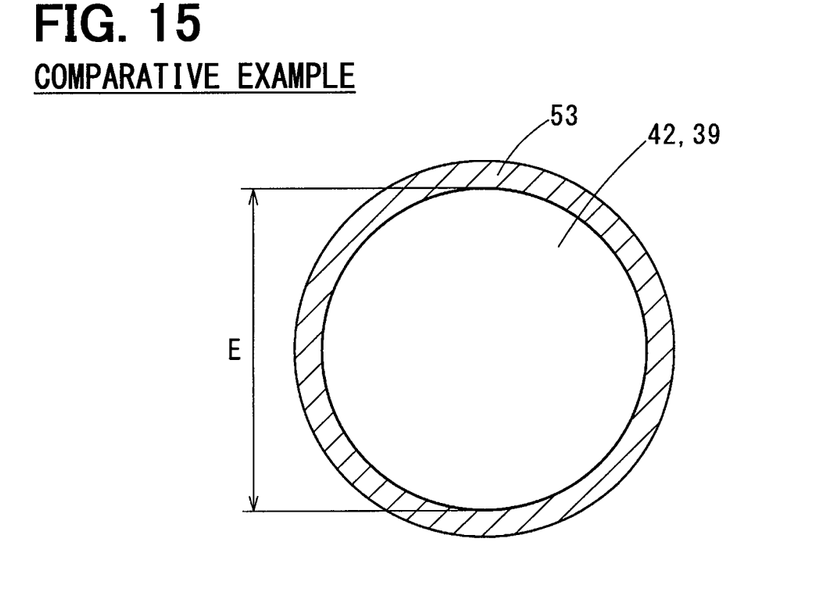
FIG. 15 is a cross-sectional view of the sealing member taken along XV-XV line that is not tilted at the ideal position where spaces are not generated around the outer circumferential surface of the valve body when the passage is closed according the comparative example.
Figure 16:
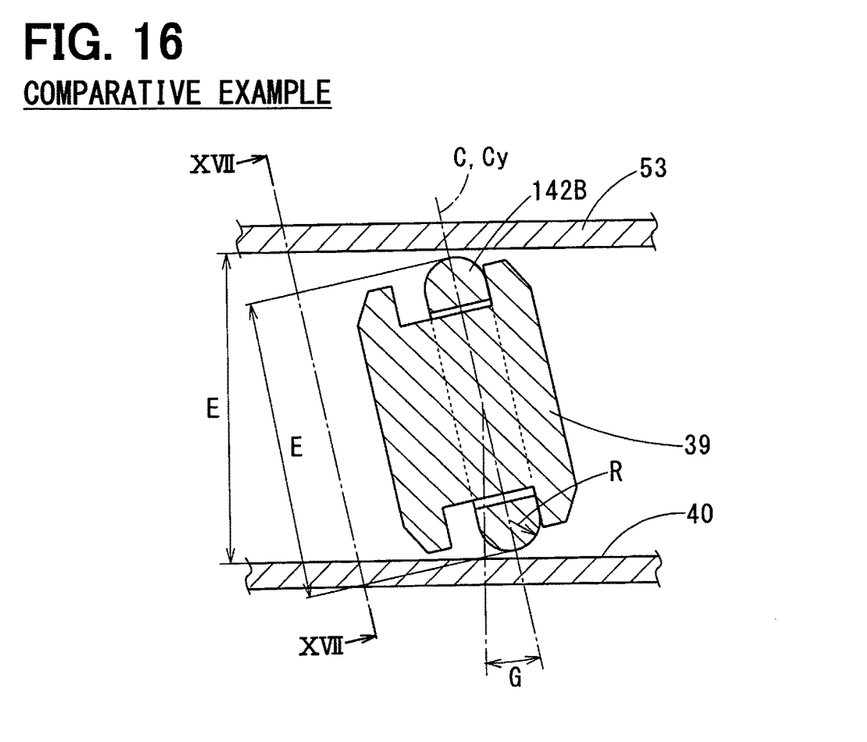
FIG. 16 is an explanatory view of the sealing member at the tilted position where the sealing member is tilted when the passage is closed according the comparative example.

The cross-section of the outer circumferential surface of the sealing member 42 is an arc shape having the diameter of the passage diameter E (see FIGS. 4 and 6). In contrast, the cross-section of the outer circumferential surface of the sealing member 142A linearly extends as shown in FIG. 10, and therefore the outer circumferential surface of the sealing member 142A has a curvature less than the curvature (the curvature of the circle having a diameter of the passage diameter E) of the outer circumferential surface of the sealing member 42 (see FIGS. 10 and 12). The sealing member 142B has a cross-section of the outer circumferential surface that is a semicircle with a radius R (see FIG. 14). The cross-section of the outer circumferential surface of the sealing member 142B has a curvature greater than the curvature (the curvature of the circle having a diameter of the passage diameter E) of the outer circumferential surface of the sealing member 42 (see FIGS. 14 and 16).

As described above, the ideal position of each of the sealing members 42, 142A, 142B is a position where each of the sealing members 42, 142A, 142B is not tilted when the passage 40 is closed. Further, a "tilted position" is defines as a position where each of the sealing members 42, 142A, 142B is tilted when the passage 40 is closed. Further, an angle of each of the sealing members 42, 142A, 142B in the tilted position relative to each of the sealing members 42, 142A, 142B in the ideal position is defined as an "angle G".

Furthermore, two axes are introduced that are perpendicular to each other on an imaginary rotational surface C of each of the sealing members 42, 142A, 142B. Since each of the sealing members 42, 142A, 142B has an annular shape, the imaginary rotational surface C has a circle shape. One of the two axes is defined as a rotational axis Cx about which the sealing member 42, 142A, 142B rotates. The other of the two axes is defined as an axis Cy (hereinafter, referred to as an "orthogonal axis Cy") that passes through the center of the imaginary rotational surface C, extends on the imaginary rotational surface C, and is perpendicular to the rotational axis Cx.

In the ideal position, all the sealing members 42, 142A, 142B are not tilted and the diameter of each of the sealing members 42, 142A, 142B is equal to the passage diameter E. Therefore, there is no space generated around the outer circumferential surface of each of the sealing members 42, 142A, 142B (see FIGS. 4, 5, 10, 11, 14, and 15).

On the contrary, in the tilted position of the sealing members 142A, 142B are used, spaces are generated around the outer circumferential surface of each of the sealing members 142A, 142B (see FIGS. 12, 13, 16, and 17).

Figure 12:
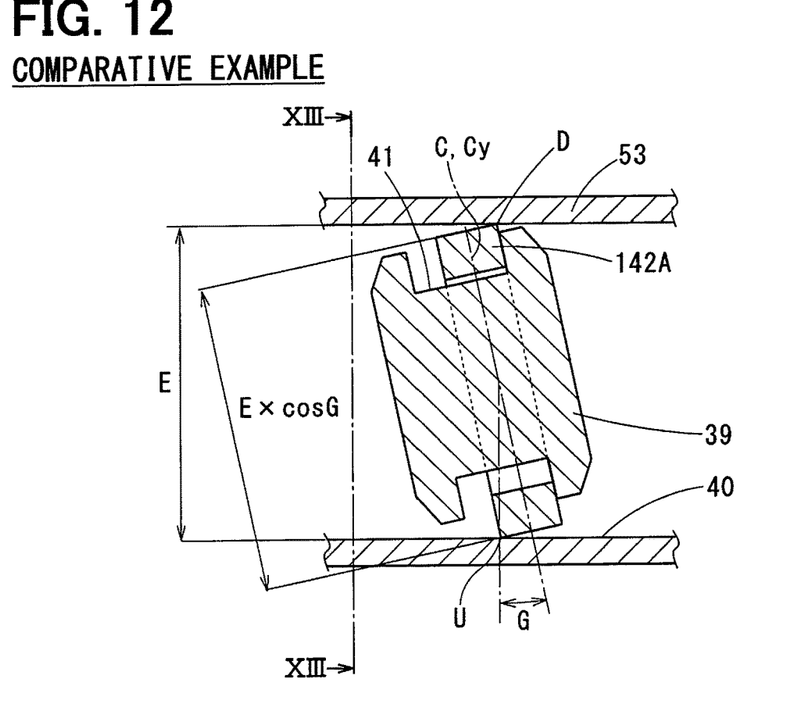
FIG. 12 is an explanatory view of the sealing member at the tilted position where the sealing member is tilted when the passage is closed according the comparative example.
Figure 13:
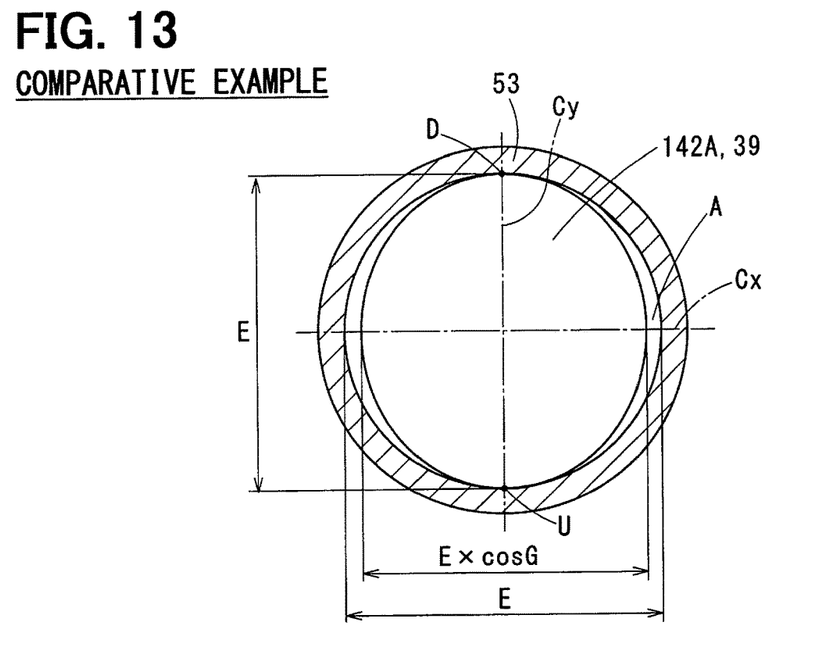
FIG. 13 is a cross-sectional view of the sealing member taken along XV-XV line at the tilted position where spaces are generated around the outer circumferential surface of the valve body when the passage is closed according the comparative example.

As for the sealing member 142A as shown in FIGS. 12 and 13, the sealing member 142A in the tilted position comes into contact with the inner wall of the passage 40 at the point U, which is one of two cross points between the outer circumferential surface and the axis Cy when viewed from an upstream side of the sealing member 142A (see FIG. 13), and the point D, which is the other of the two cross points between the outer circumferential surface and the axis Cy when viewed from the upstream side of the sealing member 142A (see FIG. 13). The point U is positioned upstream of the point D (see FIG. 12). At this point, the sealing member 142A is compressed by a certain compression amount within the clearance α due to a pressure from the inner wall of the passage 40, and the diameter of the sealing member 142A is represented as E*cos G which is less than the passage diameter E.

Thus, spaces A are formed around the regions of the outer circumferential surface of the sealing member 142A other than the points U and D (see FIG. 13).

Each of the spaces A becomes large at an area where the rotational axis Cx passes through, and the maximum area of the space A has a value that is the difference between the passage diameter E and the diameter of the sealing member 142A (i.e., E*cos G).

It should be noted that the spaces A are formed at points other than the points U and D when the curvature of the cross-section of the outer circumferential surface of the sealing member 42 is less than the curvature of the circle having the passage diameter E.

As for the sealing member 142B (see FIGS. 16 and 17), when the sealing member 142B is tilted, portions of the sealing member 142B other than points M, N through which the rotational axis Cx passes when viewed from the upstream side of the sealing member 142 (see FIG. 17) separate away from the inner wall of the passage 40. Thus, spaces B are formed around the outer circumferential surface of the sealing member 142B other than the points M, N.

Figure 17:
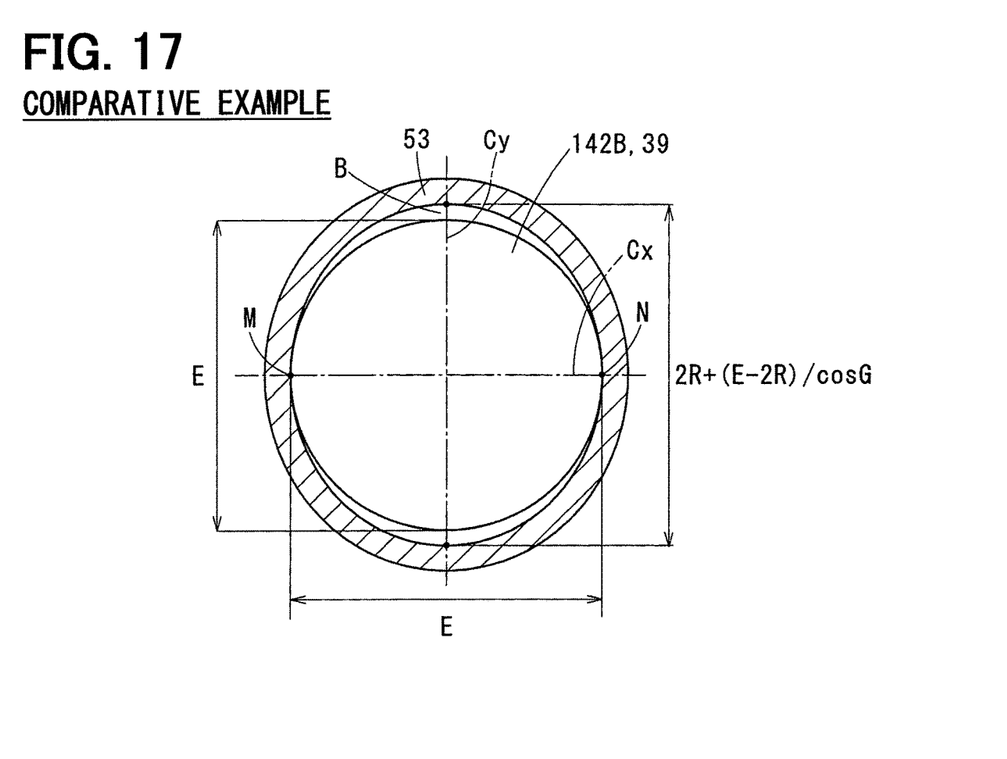
FIG. 17 is a cross-sectional view of the sealing member taken along XVII-XVII line at the tilted position where spaces are generated around the outer circumferential surface of the valve body when the passage is closed according the comparative example.

Each of the spaces B becomes large at an area where the orthogonal axis Cy passes through, and the maximum area of the space B when viewed from a direction perpendicular to the rotational surface C can be represented as following. That is, the cross-section of the passage 40 taken along line XVII-XVII that extends in parallel with the imaginary rotational surface C has an ellipse shape, as shown in FIG. 17. The length of the space of the passage along the orthogonal axis Cy is represented as 2R+(E−2R)/cos G. Thus, the maximum value of the spaces B is the difference between the length 2R+(E−2R)/cos G and the diameter (the passage diameter E) of the sealing member 142B.

In contrast, there is no space formed around the outer circumferential surface of the sealing member 42 according to the sealing member 42 of the present embodiment even if the sealing member 42 is tilted, as shown in FIG. 6. This is because the diameter of the sealing member 42 maintains the passage diameter E, and therefore contact between the outer circumferential surface of the sealing member 42 and the inner wall of the passage 40 is maintained entirely around the imaginary rotational surface C (see FIGS. 6 and 7).

As described above, the spaces A and B (see FIGS. 13 and 17), which are formed when the sealing members 142A and 142B are used, respectively, are not formed when the sealing member 42 according to the present embodiment is used. Thus, in the valve device 1 having the sealing member 42 disposed in the groove 41 around the outer circumferential surface of the valve body 39, generation of spaces can be prevented even if the sealing member 42 is tilted.

Especially, in a case where the valve device 1 is used as a device to control flow of exhaust gas, the valve body 39, the sealing member 42, and the housing 44 significantly change in their volumes due to drastic temperature change at the passage 40 between high temperature of the exhaust gas and low temperature of the outside air at a cold area. Therefore, to control the exhaust gas flow (on/off), it is necessary to make the clearances α, β much larger. As a result, the angle G of the butterfly valve 42 becomes large. Therefore, if the sealing members 142A and 142B are used, the spaces A, B shown in FIGS. 13 and 17 would become larger.

Therefore, if the sealing member 42 is used to close and open the passage 40, the advantages of preventing generation of spaces can be more effective.

When the valve device 1 is used in the valve apparatus 35 of the low pressure EGR device 8, the advantage of preventing generation of spaces can be significantly effective.

This is because a flow amount of EGR gas passing through the low pressure EGR passage 37 is controlled so as not to have water contained in the EGR gas condense, when the low pressure valve passage 37 is opened by the valve apparatus 35. However, when the low pressure EGR passage 37 is closed by the valve device 35, if spaces are formed and the exhaust gas is released to an downstream side of the valve body 39 through the spaces, it would be difficult to prevent the released exhaust gas from condensing into water. Such condensed water may adhere to the supercharger 6 and may cause damage thereto.

Therefore, when the valve device 1 is used in the valve apparatus 35, the space prevention advantages as described above are very significant.

Figure 3C:
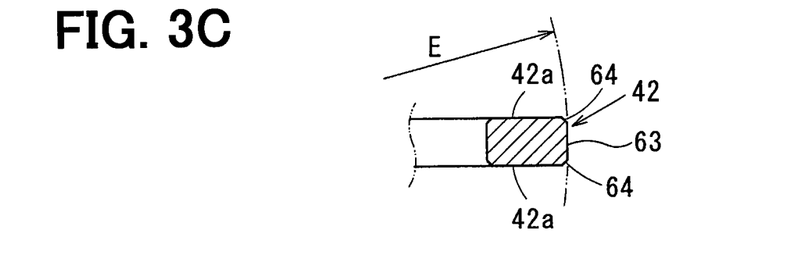
FIG. 3C is a partially cross-sectional view of the sealing member.

The side surface 42a of the sealing member 42 defining the clearance β is perpendicular to the axis of the sealing member 42, and the arc surface 63 and each of the side surfaces 42a are continuously connected to each other through a chamfered portion 64 (see FIGS. 3C and 4).

Second Embodiment

Figure 8:
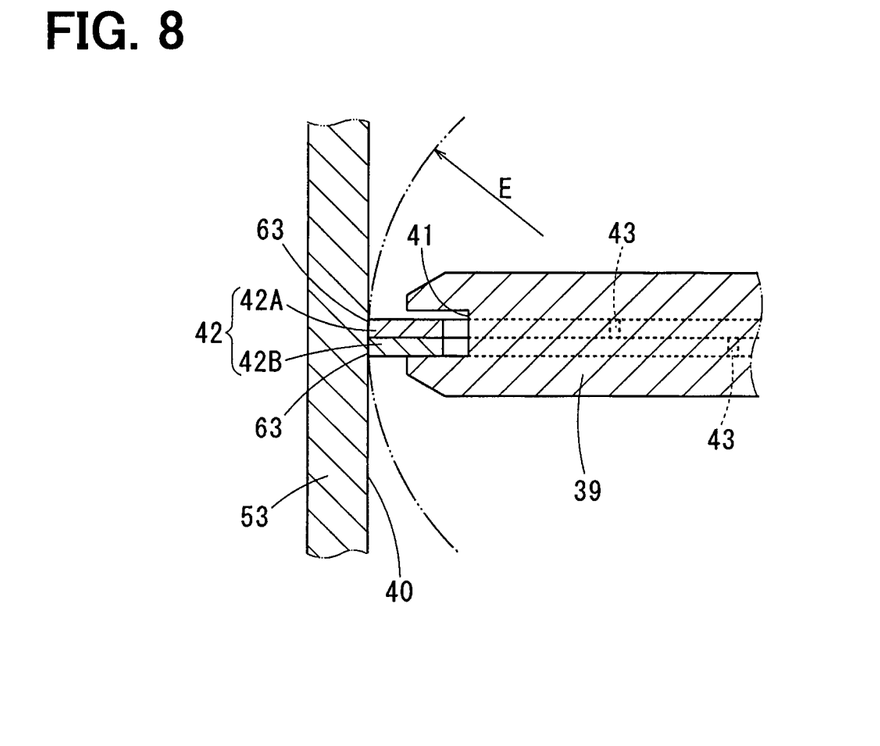
FIG. 8 is a partially cross-sectional view of the sealing member according to a second embodiment.

The valve device 1 of the second embodiment has the sealing member 42 as shown in FIG. 8. The sealing member 42 is formed of two annular rings 42A, 42B. Each of the rings 42A, 42B includes an opening 43. The rings 42A and 42B are fit into the groove 41 while being piled up each other. The opening 43 of the ring 42A is offset from the opening 43 of the ring 42B along the circumferential direction of the rings 42A, 42B. Thus, the two openings 43, 43 are not in communication with each other (i.e., the two openings 43 and 43 are closed by rings 42A and 42B, respectively), whereby release of exhaust gas through the openings 43 can be suppressed.

The outer circumferential surface of the sealing member 42 according to the second embodiment is formed of two outer circumferential surfaces of the rings 42A, 42B. Each of the outer circumferential surfaces of the rings 42A, 42B is an arc surface 63 having a diameter equal to the diameter E of the passage 40. Thus, when the passage 40 is closed, the arc surfaces 63 come into contact with the inner wall of the passage 40.

According to the valve device 1 of the second embodiment, the same advantages and operation as the first embodiment can be attained.

It should be noted that the rings 42A, 42B are formed of a stainless steel such as SUS304 stainless steel.

Other Embodiments

In the first embodiment, the valve device 1 is used in the valve apparatus 35 that adjusts an amount of the EGR gas recirculated into the intake passage 19 through the low pressure EGR passage 37. Alternatively, the valve device 1 may be applied to the throttle 18. As a result, closing performance of the throttle 18 can be improved by the valve device 1, and thus a negative pressure of the intake manifold 15 is easily maintained. Hence, the EGR gas can be effectively intruded into the intake manifold 15.

The valve device 1 of the above-described embodiments has the sealing member 42 made of a stainless steel such as SUS304 stainless steel. However, the material of the sealing member 42 may be changed depending on operating temperatures. For example, when the valve device 1 is used under a high operating temperature, SUS304 stainless steel may be used as with the embodiments, while when the valve device 1 is used under a low operating temperature, resin material such as polyetheretherketone, polyphenylene sulfide, or polytetrafluoroethylene may be used. Furthermore, a rubber may be used for the sealing member 42. If a rubber is used, the outer circumferential surface of the sealing member 42 is completely sealed by the rubber, thereby completely preventing the release of exhaust gas.

The arc surface 63 and the side surfaces 42a of the sealing member 42 are continuously connected to each other through the chamfer portions 64. Thus, if the sealing member 42 is made from resin material, the arc surface 63 can be formed during molding process, and therefore the arc surface 63 need not be formed after processing.

Figure 9:
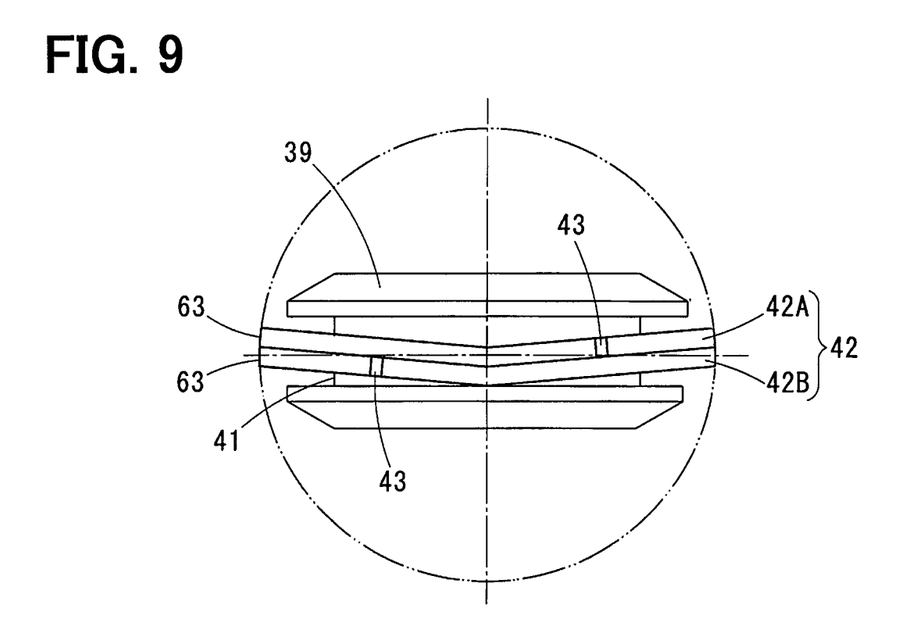
FIG. 9 is a partially cross-sectional view of the sealing member according to a modified embodiment.

In the valve device 1 of the second embodiment, each of the rings 42A, 42B may be formed into a waveform continuously extending along the circumferential direction, as shown in FIG. 9. Then, the ring 42A and the ring 42B may be piled up each other so that the waveforms of the ring 42A engage with the waveforms of the ring 42B. As a result, the positions of the rings 42A, 42B are not changed due to the engagement, and thus it is possible to prevent the openings 43 of the rings 42A, 42B from aligning with each other.

What is claimed is:

1. A valve device comprising:
   a housing defining a passage therein that has a circular cross-section with a diameter, the passage extending along a center axis;
   a shaft rotatably supported by the housing;
   a butterfly valve having a disk shape and defining a groove formed on an outer circumferential surface, the butterfly valve being fixed to the shaft and housed in the passage to selectively open and close the passage; and
   a sealing member having an annular shape and fit into the groove, the sealing member being disposed coaxially with the center axis of the passage and configured to be rotatable about a rotational axis that passes through and is perpendicular to the center axis, wherein the groove includes a bottom and a side surface, the sealing member and the bottom of the groove define a clearance therebetween along a radial direction of the sealing member, the sealing member and the side surface of the groove define a clearance therebetween along a thickness direction of the sealing member, the sealing member is configured to seal between the outer circumferential surface of the butterfly valve and an inner wall of the passage, when the passage is closed by the butterfly valve, by being elastically deformed to have at least a portion of an outer circumferential surface of the sealing member come into contact with the inner wall of the passage, the outer circumferential surface of the sealing member is spherically shaped and in a cross-section that is perpendicular to the rotational axis and extends through the center axis has an arc surface having a diameter equal to the diameter of the passage, and the arc surface comes into contact with the inner wall of the passage when the passage is closed.

2. The valve device according to claim 1, wherein the sealing member includes a side surface perpendicular to an axis of the sealing member, and the arc surface and the side surface of the sealing member are continuously connected to each other through a chamfered portion.

3. An internal combustion engine, comprising:

a valve device;

an intake manifold; and a supercharger, wherein the valve device comprises:
- a housing defining a passage therein that has a circular cross-section with a diameter, the passage extending along a center axis;
- a shaft rotatably supported by the housing;
- a butterfly valve having a disk shape and a groove formed on an outer circumferential surface, the butterfly valve being fixed to the shaft and housed in the passage to selectively open and close the passage; and
- a sealing member having an annular shape and fit into the groove, the sealing member being disposed coaxially with the center axis of the passage and configured to be rotatable about a rotational axis that passes through and is perpendicular to the center axis, wherein the groove includes a bottom and a side surface, the sealing member and the bottom of the groove define a clearance therebetween along a radial direction of the sealing member, the sealing member and the side surface of the groove define a clearance therebetween along a thickness direction of the sealing member, the sealing member is configured to seal between the outer circumferential surface of the butterfly valve and an inner wall of the passage, when the passage is closed by the butterfly valve, by being elastically deformed to have at least a portion of an outer circumferential surface of the sealing member come into contact with the inner wall of the passage, the outer circumferential surface of the sealing member is spherically shaped and in a cross-section that is perpendicular to the rotational axis and extends through the center axis has an arc surface having a diameter equal to the diameter of the passage, and the arc surface comes into contact with the inner wall of the passage when the passage is closed, wherein the valve device is disposed in a circulation passage that recirculates a portion of an exhaust gas discharged from a combustion chamber of the internal combustion engine into an intake passage, the butterfly valve is rotated together with the shaft to adjust a flow amount of the exhaust gas to be recirculated into the intake passage, and the supercharger is disposed between the intake manifold and the circulation passage.

4. The internal combustion engine according to claim 3, wherein the sealing member includes a side surface perpendicular to an axis of the sealing member, and the arc surface and the side surface of the sealing member are continuously connected to each other through a chamfered portion.

* * * * *